United States Patent [19]

Sekine et al.

[11] Patent Number: 5,127,569
[45] Date of Patent: Jul. 7, 1992

[54] METHOD AND APPARATUS FOR ASSEMBLING VEHICLE BODY

[75] Inventors: Yoshitada Sekine, Yokohama; Tatsuo Miyauchi, Utsunomiya; Kazuyoshi Abe, Tokyo; Tohru Nishiyama, Ayase; Hiroyuki Ono, Yokohama, both of Japan

[73] Assignee: Nissan Motor Co., Ltd., Yokohama, Japan

[21] Appl. No.: 718,973

[22] Filed: Jun. 21, 1991

Related U.S. Application Data

[62] Division of Ser. No. 510,422, Apr. 18, 1990, Pat. No. 5,044,541.

[30] Foreign Application Priority Data

| Apr. 21, 1989 | [JP] | Japan | 1-100209 |
| Apr. 27, 1989 | [JP] | Japan | 1-105807 |
| Apr. 27, 1989 | [JP] | Japan | 1-105810 |
| Jun. 6, 1989 | [JP] | Japan | 1-142172 |

[51] Int. Cl.⁵ ............................ C23K 37/04
[52] U.S. Cl. ................... 228/6.1; 228/49.1; 29/771; 29/783; 29/824
[58] Field of Search ........ 228/4.1, 6.1, 49.1, 228/44.3, 47; 29/771, 783, 430, 824; 219/79, 80, 158, 161

[56] References Cited

U.S. PATENT DOCUMENTS

| 4,535,927 | 8/1985 | Matsubara et al. | 228/6.1 |
| 4,667,866 | 5/1987 | Tobita et al. | 228/6.1 |
| 4,738,387 | 4/1988 | Jaufmann et al. | 228/47 |
| 4,767,046 | 8/1988 | Kumagai et al. | 228/47 |
| 4,869,416 | 9/1989 | Harada et al. | 228/4.1 |

FOREIGN PATENT DOCUMENTS

251730 9/1969 U.S.S.R. ...................... 228/61

*Primary Examiner*—Samuel M. Heinrich
*Attorney, Agent, or Firm*—Foley & Lardner

[57] ABSTRACT

In a flexible manufacturing system for assembling various types of vehicle bodies, there is employed a work piece carrier on which a work piece positioning device is mounted. The work piece positioning device has a plurality of position changeable work piece holders which are grouped into a plurality of groups each having its own power input device. When the carrier comes to a type switching stage together with the work piece positioning device, a power source installed in the type switching stage is brought into connection with the power input device of one of the groups thereby to changing the positions of the corresponding work piece holders. Then, the power source is brought into connection with the other power input device of the other group to change the positions of the corresponding work piece holders.

10 Claims, 16 Drawing Sheets

METHOD AND APPARATUS FOR ASSEMBLING VEHICLE BODY

This application is a division of application Ser. No. 07/510,422, filed Apr. 18, 1990, now U.S. Pat. No. 5,044,541.

BACKGROUND OF THE INVENTION

1. Field of the Invention

The present invention relates in general to a method and an apparatus for assembling a vehicle body, and more particularly to a method and an apparatus for assembling various types vehicle bodies by using a flexible manufacturing system (FMS).

2. Description of the Prior Art

Hitherto, in order to assemble various types of vehicle bodies on a common assembling line, a so-called "flexible manufacturing system (FMS)" has been proposed and put into a practical use.

In such assembling system, a method has been employed in which vehicle parts or work pieces (viz., main floor panels, body side panels, roof panels and the like) are temporarily positioned on a work piece carrier and then, the carrier is moved, together with o the work pieces kept positioned thereon, to an assembling stage where the work pieces are to be spot-welded to constitute a desired structure for a vehicle body.

Such method is disclosed in, for example, Japanese Patent First Provisional Publication No. 62-110581. That is, in the method of this publication, a plurality of program controlled positioning robots of orthogonal axes type are arranged on the work piece carrier, each robot being movable in the X, Y and Z directions of the rectangular coordinate system and having an arm which has at its leading end a work piece holder. In operation, given work pieces are held in position by the work piece holders of the robots on the carrier, and then the carrier is moved, by an external drive means, to an assembling position with the work pieces kept held in position by the work piece holders. At the assembling position, the work pieces are spot-welded by various welding robots.

Each time a changing of the type of the vehicle bodies to be assembled is required, a change is made to the control program for the robots to change the positions of the work piece holders thereon for allowing the work piece holders to appropriately hold the work pieces for the new vehicle bodies which are to be produced.

However, the above-mentioned method has the following drawback.

That is, because numerous robots are arranged on the carrier, the carrier is compelled to have numerous drive means (viz., servomotors) for actuating the robots. Thus, when it is intended to use a plurality of carriers of this type in the vehicle body assembling line, it becomes necessary to use a great number of servomotors and thus a great number of control units for controlling the servomotors. As is readily apparent, this results in a greater cost for the assembling line and a more complicated controlling requirement for the servomotors.

SUMMARY OF THE INVENTION

It is therefore an object of the present invention to provide a method and an apparatus for assembling a vehicle body, which solve the above-mentioned drawback.

According to the present invention, there is provided, in a flexible manufacturing system for assembling various types of vehicle bodies, the system including a plurality of work piece carriers which run along a guide way, each carrier having thereon a work piece positioning device which includes a plurality of position changeable work piece holders by which at least one work piece is held and positioned with respect to the carrier, a method for carrying the work piece to a certain assembling stage. The method comprises by steps (a) moving the carrier together with the work piece positioning device to a type switching stage, the type switching stage being capable of actuating the work piece positioning device by using a power source mounted on the type switching stage, (b) connecting the power source on the type switching stage to the work piece positioning device to change the positions of the work piece holders in accordance with a type of work piece which will be subsequently handled by the positioning device, (c) disconnecting the power source from the positioning device upon completion of the position change of the work piece holders, (d) moving the carrier together with the work piece positioning device to a work piece pick up stage, (e) picking up at least one selected work piece from a work piece storing rack and putting the selected work piece onto the work piece holders of the positioning device; and (f) moving the carrier together with the positioning device to the certain assembling stage with the selected work piece kept held by the work piece holders and positioned with respect to the carrier.

According to the present invention, there is further provided a flexible manufacturing system for assembling various types vehicle bodies. The system comprises a main assembling line; a plurality of sublines located beside the main assembling line, each subline including a plurality of work piece carriers which run along a guide way and a work piece positioning device mounted on each of the work piece carriers, each work piece positioning device including a plurality of position changeable work piece holders by which at least one work piece is held and positioned with respect to the carrier; and a plurality of assembling stages which are positioned at spaced portions of the main assembling line, each assembling stage having respective positions to which given ones of the sublines are connected, wherein each subline further includes a type switching stage which has a power source mounted therein, the type switching stage actuating the positioning device to change the positions of the position changeable work piece holders when the corresponding carrier comes to the type switching stage.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
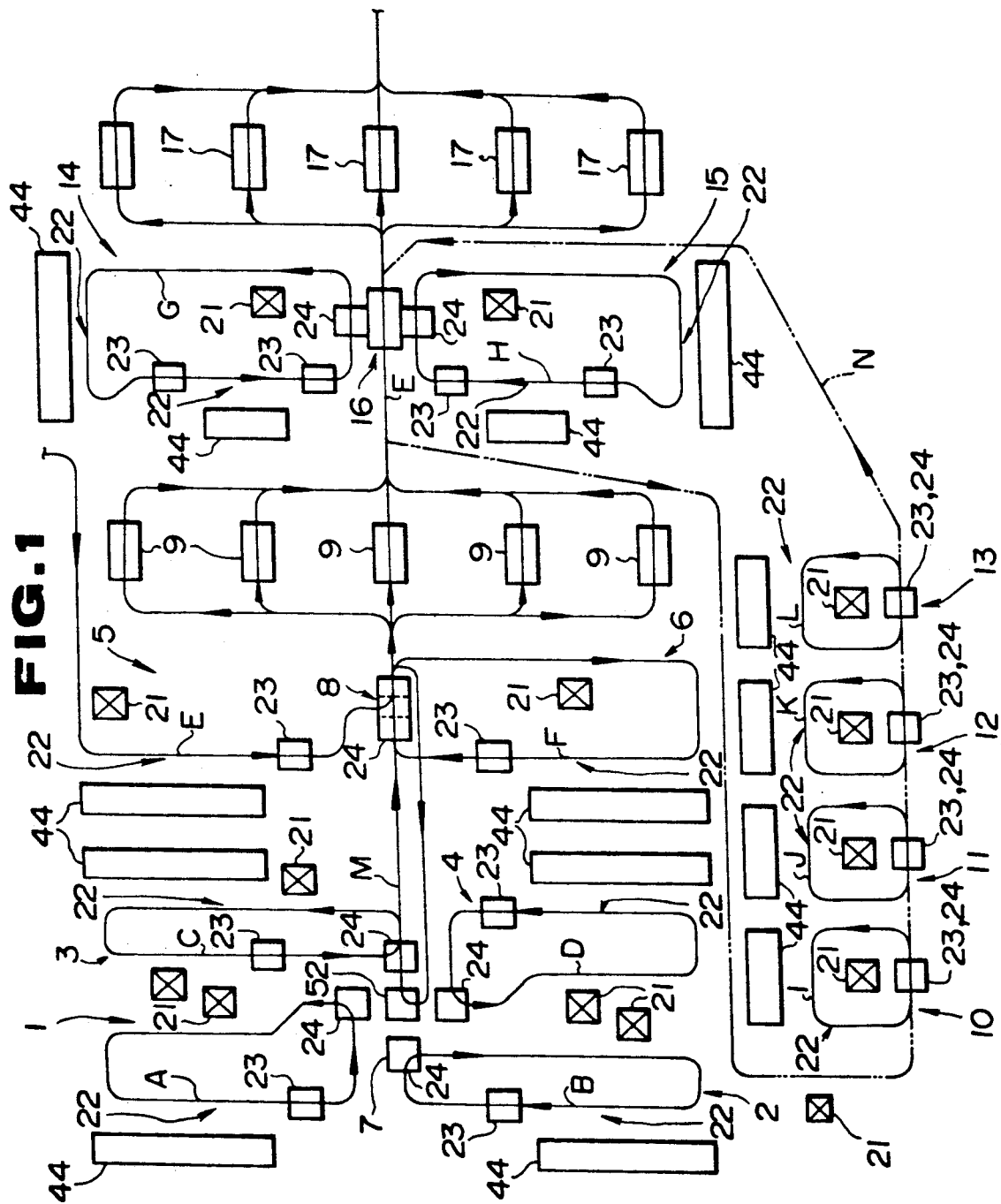
FIG. 1 is a schematically illustrated layout of a vehicle body assembling line to which the present invention practically applied.

Referring to FIG. 1, there is shown a vehicle body assembling line to which the present invention is practically applied.

In the drawing, denoted by numeral 1 is a subline for assembling a left hood ridge structure (61, see FIG. 2), 2 is a subline for a dash lower structure (63), 3 is a subline for a radiator core support (64), 4 is a subline for a right hood ridge structure (62), 5 is a subline for a front floor structure (66, see FIG. 3), and 6 is a subline for a rear floor structure (67).

The radiator core support, the left and right hood ridge structures, and the dash lower structure, which have been assembled at the corresponding sublines 3, 1, 4 and 2, are conveyed to an engine compartment assembling stage 7 and there they are spot-welded to one another to constitute an engine compartment. The engine compartment thus assembled and the front and rear floor structures, which have been assembled at the corresponding sublines 5 and 6, are conveyed to a floor main structure assembling o stage 8 and there they are spot-welded to constitute a floor main structure. In this assembling stage 8, a limited number of spot welds is carried out, which are sufficient for sustaining the shape of the floor main structure. Then, the floor main structure is conveyed to one of the floor main structure final welding stages 9 and there the floor main structure is finally spot-welded. That is, in this stage 9, a full number of spot welds is carried out for achieving a solidly-built construction of the floor main structure. In the illustrated embodiment, five stages 9 are employed.

In FIG. 1, denoted by numeral 10 is a subline for assembling a roof panel structure, 11 is a subline for a parcel shelf structure, 12 is a subline for an air box structure, 13 is a subline for a rear panel structure, 14 is a subline for a left body side structure and 15 is a subline for a right body side structure.

The roof panel structure, the parcel shelf structure, the air box structure and the left and right body side structures, which have been assembled at the corresponding sublines 10, 11, 12, 13, 14 and 15, and the floor main structure, which has been fully spot-welded at the stage 9, are conveyed to a body main structure assembling stage 16, and there, they are spot-welded to one another to constitute a body main structure. The body main structure is substantially in the form of the vehicle body. The body main structure is then conveyed to one of the body main structure final welding stages 17 and there, the body main structure is finally spot-welded. In the illustrated embodiment, five stages 17 are employed.

Figure 2:
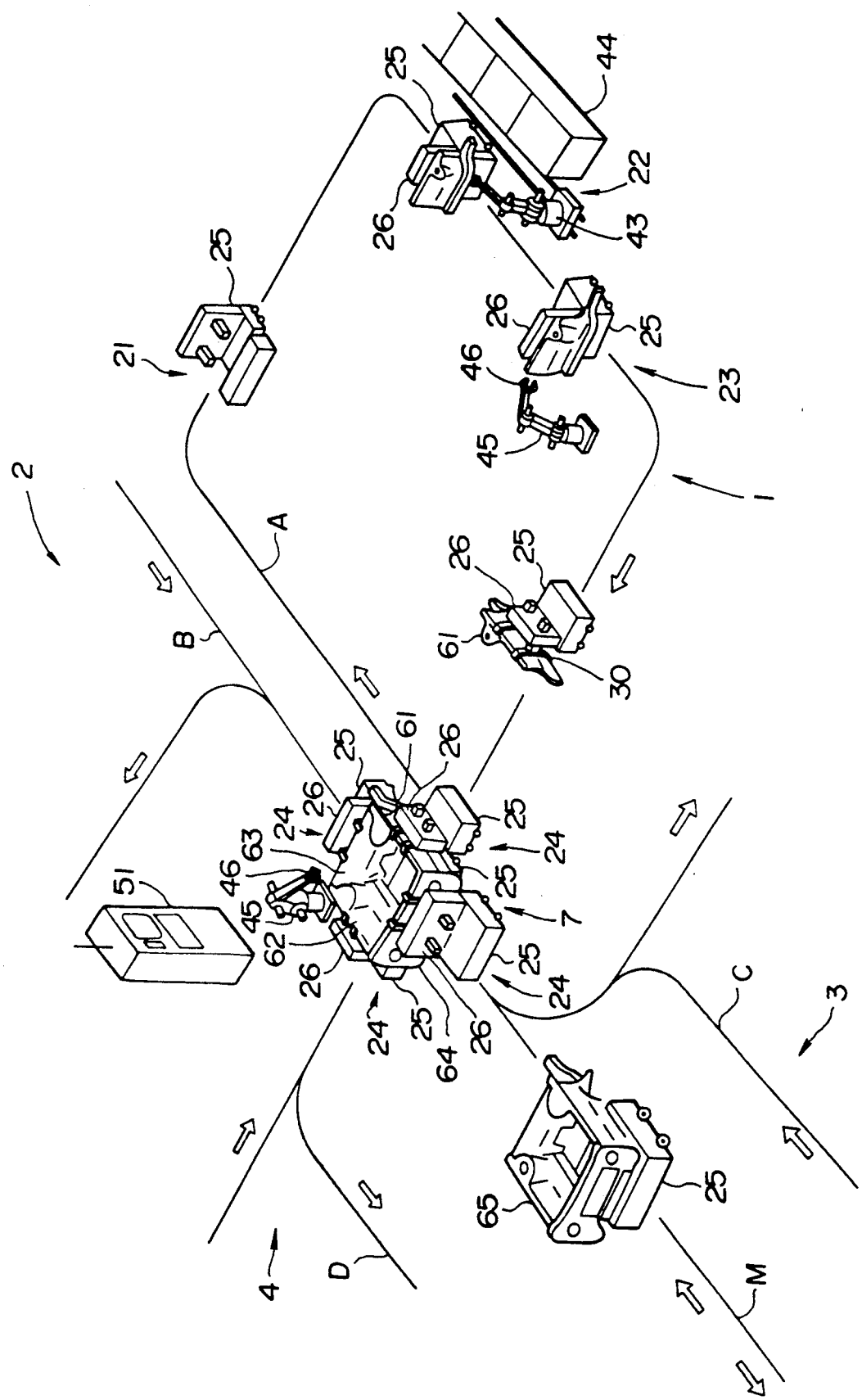
FIG. 2 is a perspective view showing schematically an engine compartment assembling stage and a subline for assembling a left hood ridge structure, which are arranged in the vehicle body assembling line of FIG. 1.

As is seen from FIG. 2, the left hood ridge structure assembling subline 1 comprises generally a type switching stage 21, a work piece pick up stage 22, an assembling stage 23 and a transferring stage 24. Similar to this, as is seen from FIG. 3, the front floor structure assembling subline 5 comprises generally a type switching stage 21, a work piece pick up stage 22, an assembling stage 23 and a transferring stage 24.

Although not shown in the drawings, the sublines other than the above-mentioned sublines 1 and 5 also have stages corresponding to the stages 21, 22, 23 and 24, respectively.

As shown in FIG. 1, each subline further comprises a looped guide way A, B, C, D, E, F, G, H, I, J, K or L along which one or more self-propelled work piece carriers 25 move. The number of the carriers 25 used in each subline is determined in accordance with the production volume of the vehicles which is planned.

The work piece carrier 25 comprises steered road wheels, driving road wheels, a drive means for driving the driving road wheels and a steering means for operating the steered road wheels. The drive means comprises an electric motor operatively connected to the driving road wheels and a battery for energizing the motor. The steering means comprises a position sensor which senses the position of a guide tape which extends along the looped guide way, and a mechanism which operates the steered road wheels by receiving a guide signal from the position sensor.

The work piece carrier 25 further comprises a movement controller of the radio-controlled type which functions to stop the carrier 25 at a predetermined position when the carrier 25 approaches to each stage, and to start the carrier 25 when the work at the stage is finished.

The system for stopping the carrier 25 at a predetermined position will be described hereinafter with reference to FIGS. 15, 16, 17 and 18 of the accompanying drawings.

The work piece carrier 25 still further comprises a supersonically controlled carrier stopper which functions to stop the carrier 25 when an obstacle is left in the path of the carrier 25, and to start the carrier 25 when the obstacle is removed from the path.

Figure 4:
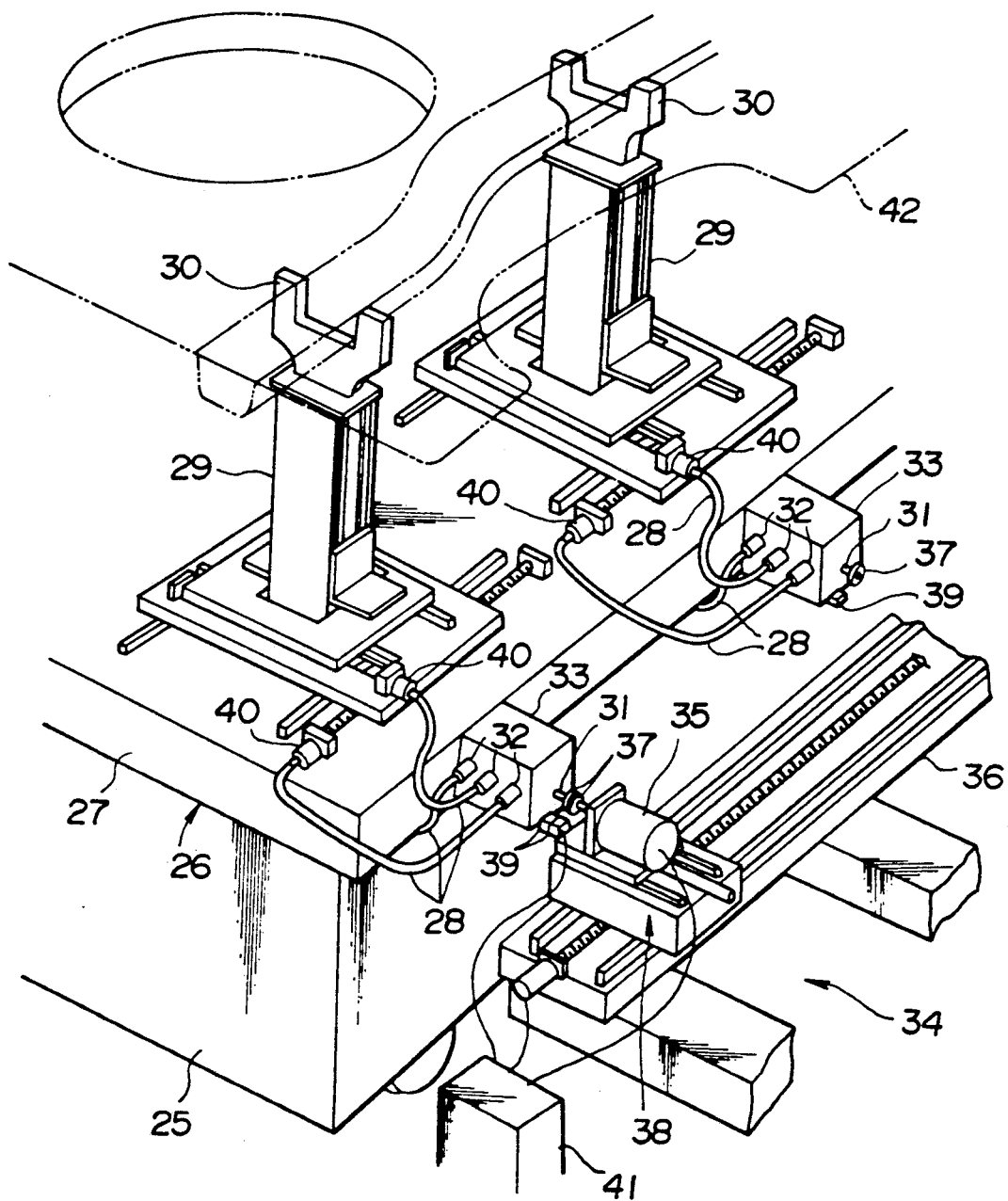
FIG. 4 is a perspective view showing a carrier, a part of a work piece positioning device and a part of a drive device for a type switching stage, which are arranged in the vehicle body assembling line of FIG. 1.
Figure 5:
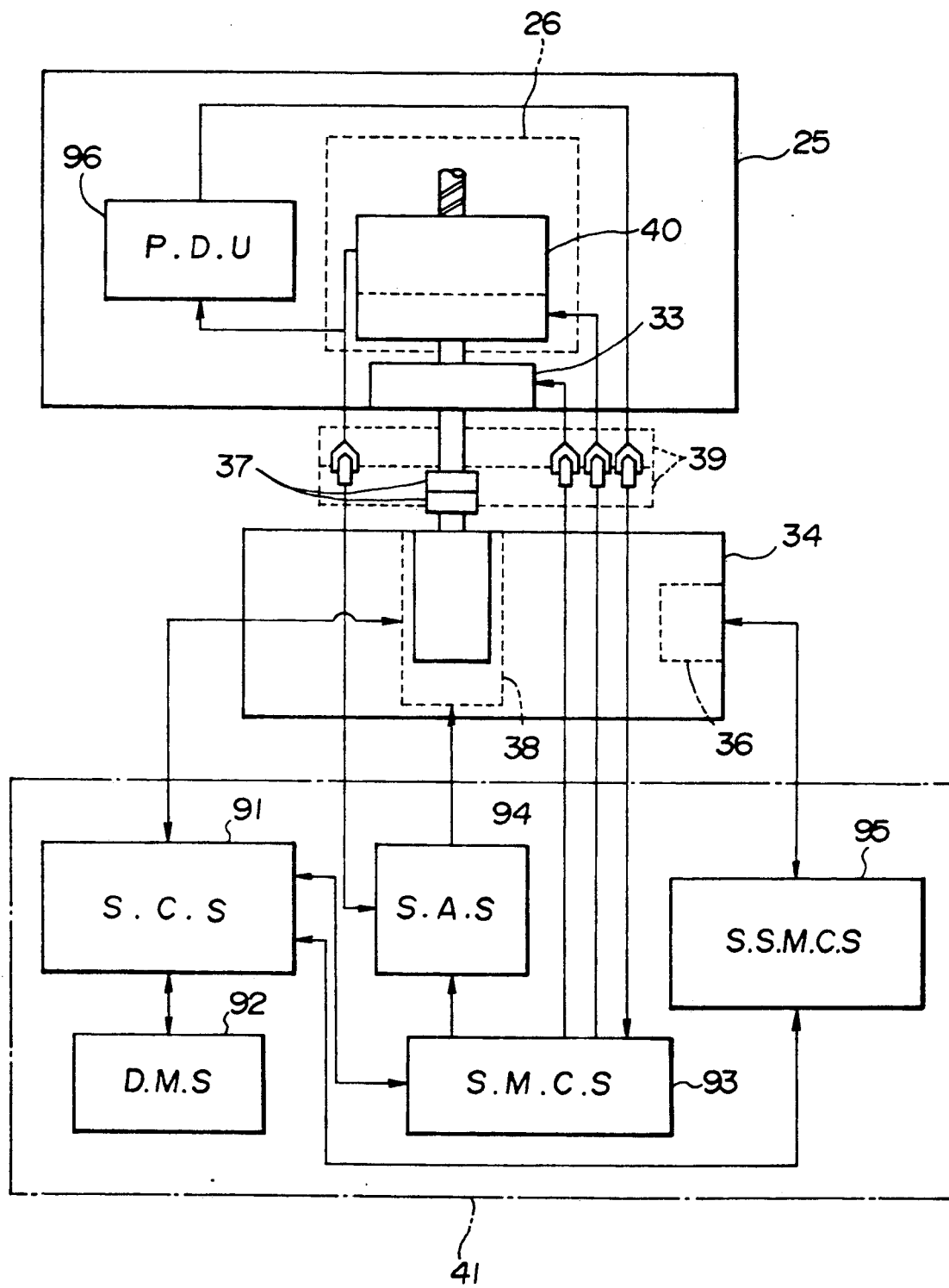
FIG. 5 is a block diagram showing a control system for the drive device for the type switching stage.

As is seen from FIG. 4, the work piece carrier 25 has a work piece positioning device 26 which is securedly or detachably mounted on the carrier 25.

Figure 19:
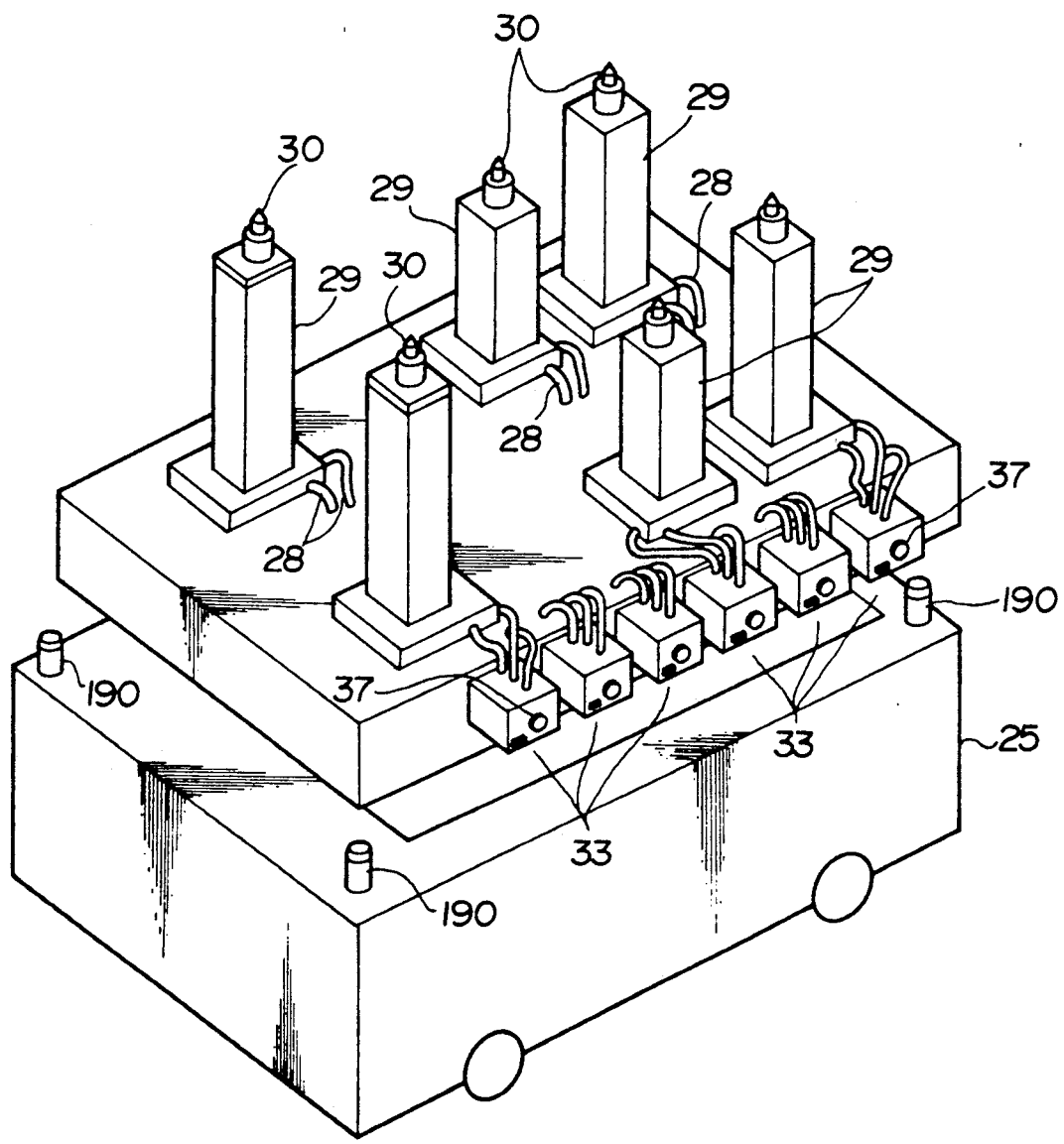
FIG. 19 is a perspective view of another carrier and another work piece positioning device, which are employable in the vehicle body assembling line of FIG. 1.

FIG. 19 shows a work piece positioning device 26 which is detachably mounted on the carrier 25. In this case, the carrier 25 has a plurality of locating pins 190 which are insertable into locating bores formed in a base board 27 of the positioning device 26.

Referring back to FIG. 4, the work piece positioning device 26 functions to hold a work piece in position. The device 26 shown in FIG. 4 is designed for use in a subline, such as the rear floor structure assembling subline 6, where it is needed to hold up the work piece.

The work piece positioning device 26 comprises a base board 27 which is securely (or detachably) mounted on the work piece carrier 25, a plurality of work piece holders 30 which function to hold thereon a certain work piece or work pieces (as illustrated by broken lines) and a plurality of three-dimensional moving mechanisms 29. Each moving mechanism 29 comprises first, second and third linear movers which are movable in the X, Y and Z directions of a rectangular coordinate system, respectively. Each linear mover includes a ball screw which is rotatably driven by a flexible shaft 28. A rotary encoder 40 equipped with an electromagnetic brake is arranged at a joint portion between the ball screw and the corresponding flexible shaft 28 for the purpose which will become apparent hereinafter. The brake is disengaged when electrically energized.

The work piece positioning device 26 further comprises an actuating mechanism 33 for each moving mechanism 29. The actuating mechanism 33 includes three output shafts 32 to which the flexible shafts 28 from the ball screws are connected, and one input shaft 31 to which the three output shafts 32 are selectively connected through respective electromagnetic clutches and gears which are housed. Thus, when the input shaft 31 is driven, the ball screws of the three-dimensional moving mechanism 29 are selectively rotated thereby to three-dimensionally move the corresponding work piece holder 30 to a desired position. The detail of the work piece positioning device is disclosed in Japanese Utility Model Application 62-187087.

The input shaft 31 of each actuating mechanism 33 is driven by a drive device 34 mounted on the type switching stage 21. The drive device 34 comprises a servomotor 35 whose output shaft is engageable with the input shaft 31 through a coupling 37, a servomotor shifting mechanism 36 which selectively shifts the servomotor 35 to a position where the output shaft of the servomotor 35 is aligned with the input shaft 31 of one selected actuating mechanism 33, and a pneumatically actuated servomotor shifter 38 which moves the servomotor 35 toward and away from the selected actuating mechanism 33 to achieve engagement and disengagement between the output shaft of the servomotor 35 and the input shaft 31 of the actuating mechanism 33.

An electric connector 39 which includes two parts is employed which accomplishes electric connection between the two parts when the servomotor 35 is moved toward the selected actuating mechanism 33 to achieve the engagement between the output shaft of the servomotor 35 and the input shaft 31 of the actuating mechanism 33. One part of the connector 39 is secured to a bracket (no numeral) by which the servomotor 35 is held and the other part of the connector 39 is secured to the housing in which the essential parts of the actuating mechanism 33 are housed. That is, when the two parts of the connector 39 are coupled in response to the coupling between the servomotor output shaft and the input shaft 31 of the actuating mechanism, the rotary encoder 40, the electromagnetic brake of the encoder 40, and the electromagnetic clutches of the actuating mechanism 33 are brought into electric connection with a control unit installed in a control box 41 which is located beside the drive device 34, as shown in FIG. 4.

Figure 6:
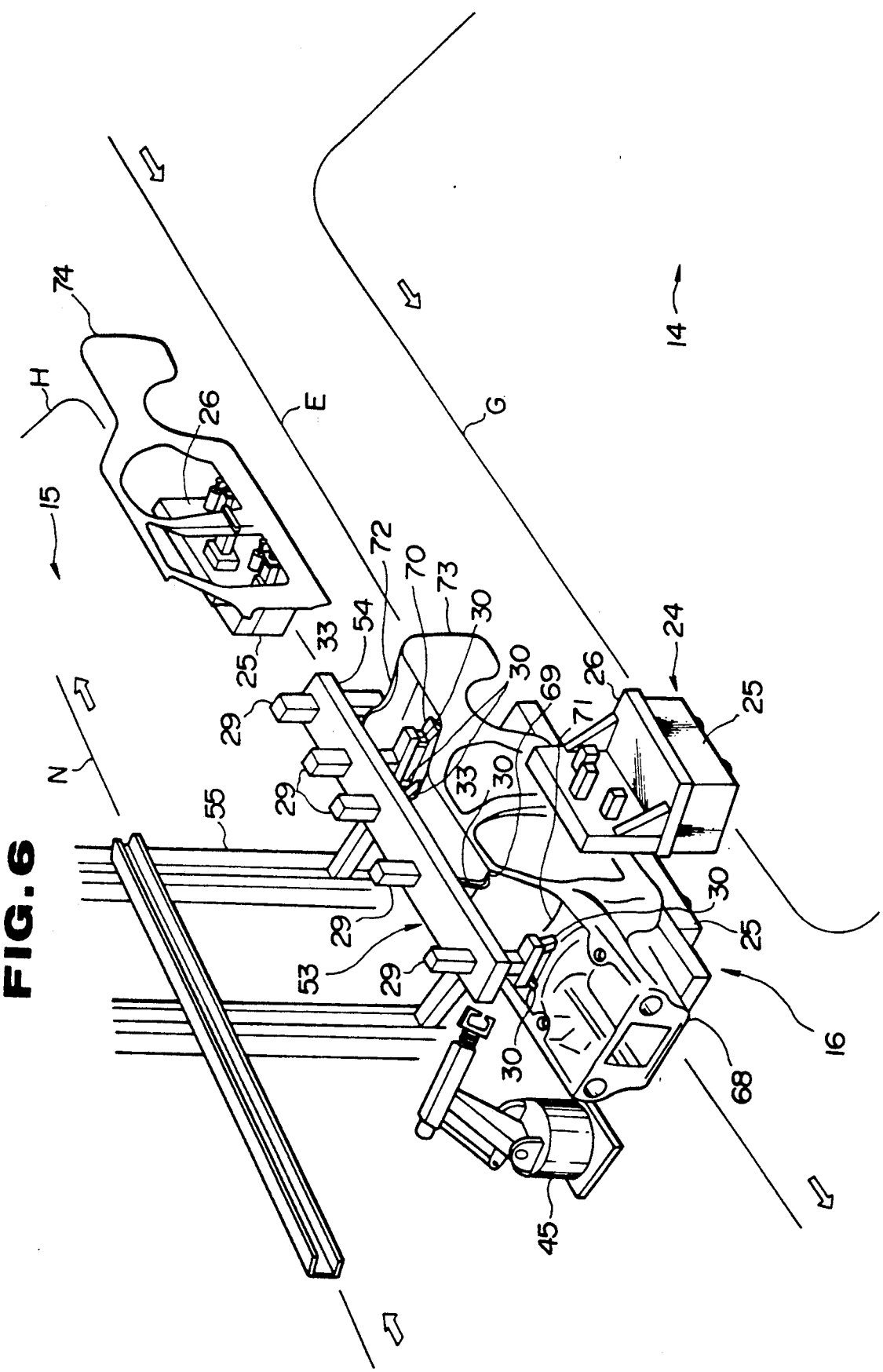
FIG. 6 is a perspective view showing a body main structure assembling stage which is arranged in the vehicle body assembling line of FIG. 1.

The control unit in the control box 41 is shown in FIG. 6, which comprises a sequence control section 91, a data memory section 92, a servomotor control section 93, a servoamplifier section 94 and a servomotor shift mechanism control section 95. Although not shown in the drawing, a unit of a radio transmitter and a radio receiver is connected to the sequence control section 91.

A certain operation program has been memorized in the sequence control section 91 for actuating the radio-controlled type carrier controller in the following manner.

When a sensor (not shown) senses that the work piece carrier 25 nears the type switching stage 21, the control unit in the control box 41 transmits an instruction radio signal to stop the carrier 25 at a predetermined position near the stage 21. (The system for stopping the carrier 25 at the predetermined position will be described hereinafter.) Then, based on position data on the actuating mechanism 33 which is memorized in the data memory section 92, the servomotor shift mechanism control section 95 actuates the servomotor shift mechanism 36 to move the servomotor 35 to a position where the output shaft of the servomotor 35 is aligned with the input shaft 31 of one of the actuating mechanisms 33. Then, the sequence control section 91 controls through a pneumatic switching valve (not shown) the air cylinder of the pneumatically actuated servomotor shifter 38 to move the servomotor 35 toward the actuating mechanism 33. With this, the output shaft of the servomotor 35 becomes engaged with the input shaft 31 of the actuating mechanism 33 through the coupling 37 and at the same time, the two parts of the electric connector 39 are coupled. With this, the servomotor control section 93 disengages the brakes of the rotary encoders 40 and selectively engages the clutches of the actuating mechanism 33. With this, the first, second and third linear movers of the moving mechanism 29 are moved in respective directions by the servomotor 35 while carrying out a feed-back control by their moved distance using the output signal of the rotary encoders 40 (or using the rotation degree of the ball screws). That is. based on the position data on the work piece holder 30, which has been memorized in the data memory section 92. the first, second and third linear movers are moved in respective directions by predetermined distances, so that the work piece holder 30 is moved to a desired position. The output signal of each rotary encoder 40, which represents the moving speed of the ball screw, is fed back to the servoamplifier 94 and at the same time, the output signal is fed to a position detecting unit 96, which is installed in the work piece carrier 25, where the output signal is converted into a position representing signal and fed back to the servomotor control section 93 for appropriately controlling the servomotor 35. After each linear mover of the moving mechanism 29 is moved by a desired distance, the servomotor control section 93 operates to engage the electromagnetic brake of each encoder 40 thereby to stop the movement of the ball screw. With this, the work piece holder 30 becomes fixed at the above-mentioned desired position. Thereafter, the servomotor shifter 38 is operated to move back the servomotor 35 thereby disengaging the coupling 37 as well as the two parts of the connector 39. Then, due to operation of the servomotor shift mechanism 36, the servomotor 35 is moved to another actuating mechanism 33.

By repeating the above-mentioned process, all of the work piece holders 30 are moved to their desired fixed positions based on the position data which have been memorized in the date memory section 92. After this, the control unit in the control box 41 transmits a radio signal to start and move the work piece carrier 25 toward the work piece pick up stage 22.

Although FIG. 4 illustrates only two moving mechanisms 29 and two actuating mechanisms 33, the number of them is not limited to such number. That is, the number is determined based on the number of the work pieces and the dimensional characteristics. such as size, shape and the like, of a work piece which is to be held. Furthermore, if desired, another drive device, which is similar to the drive device 34, may be arranged at an opposite side of the guide way. Furthermore, if desired, the moving mechanism 29 may have a rotating mechanism for increasing freedom in movement.

It is to be noted that these modifications are also applicable to the work piece positioning device 26 which is shown in FIG. 19.

Furthermore, a modification may be employed in which a compressed air tank is contained in the work piece carrier 25, a pneumatically actuated clamp mechanism for clamping a work piece is arranged on the moving mechanism 29, and a valve-mounted pipe extends between the tank and the clamp mechanism. That is, in response to an instruction radio signal emitted from the assembling stage, the valve opens or closes the pipe to operate the clamp mechanism.

Accordingly, as is shown in FIG. 4, the work piece positioning device 26 can hold various work pieces in position keeping the positional relationship therebetween. Furthermore, due to the work of the type switching stage 21, the work piece positioning device 26 can change the positions of the work piece holders 30 to new positions which are suitable for work pieces of a different type vehicle body.

It is now to be noted that, in the present invention, the operation of a plurality of moving mechanisms 29 on the work piece carrier 25 is achieved by a common servomotor 35 which is mounted on a structure other than the work piece carrier 25. This means that the number of servomotors used in all of the sublines is greatly reduced as compared with the above-mentioned conventional assembling line. Due to the reduction in the number of servomotors servomotors, the control unit for controlling the servomotors is simplified in construction. Thus, low cost production is made available by the present invention.

Referring back to FIG. 2, there is shown the left hood ridge structure assembling subline 1. It is to be noted that each work piece carrier 25 employed in this subline 1 has the above-mentioned pneumatically actuated clamp mechanism.

In operation, the work piece carriers 25 each having thereon the above-mentioned work piece positioning device 26 move along the looped guide way "A" in the direction of the thick arrows.

At the type switching stage 21, the work piece holders 30 of the carrier 25 are subjected to the above-mentioned position change. When thereafter the work piece carrier 25 comes to a predetermined position near the work piece pick up stage 22, a loading robot 43 starts to operate. With this, various work pieces (such as panel, frame and the like) are transferred from work piece storing racks 44 onto the work piece holders 30.

When the loading is finished, the stage 22 emits an instruction radio signal to the carrier 25. Upon this, the work piece carrier 25 starts to move and actuates the pneumatically actuated clamp mechanism to tightly hold the work pieces in position.

When the carrier 25 comes to and stops at a predetermined position near the assembling stage 23, a spot-welding robot 45 starts to spot-weld the work pieces on the carrier 25 by using a spot-welding gun 46. With this, a left hood ridge structure 61 is assembled. When the spot-welding is finished, the stage 23 emits an instruction radio signal to the carrier 25. With this, the carrier 25 moves to a predetermined position near the transferring stage 24.

In the illustrated embodiment, the transferring stage 24 of the left hood ridge structure assembling subline 1 serves a part of the engine compartment assembling stage 7. The engine compartment assembling stage 7 serves parts of transferring stages 24 of the right hood ridge structure assembling subline 4, the dash lower structure assembling subline 2 and the radiator core support assembling subline 3.

That is, in operation, around the engine compartment assembling stage 7, there are collected four work piece carriers 25 on which the left hood ridge structure 61, the right hood ridge structure 62, the dash lower structure 63 and the radiator core support 64 are carried. In fact, before the collection of the four loaded carriers 25, one empty carrier 25 is set at the center of the engine compartment stage 7.

The work pieces on the four loaded carriers 25 are transferred to the empty carrier 25. The work pieces are then held in position on the newly set carrier 25 due to the work of the work piece positioning device 26 mounted on the newly set carrier 25.

At the stage 7, a spot-welding robot 45 operates to spot-weld the above-mentioned structures 61, 62, 63 and 64 by using a spot-welding gun 46. With this, an engine compartment 65 is produced. When the spot-welding is finished, the four work piece carriers 25 of the respective sublines 1, 4, 2 and 3 start to move toward their type changing stages 21 leaving the structures 61, 62, 63 and 64 at the stage 7.

The center carrier 25 on which the assembled engine compartment 65 has been put then moves along a looped guide way "M" toward the floor main structure assembling stage 8 (see FIG. 1).

It is to be noted that the collection and dispersion of the four carriers 25 around and from the engine compartment assembling stage 7 is so made as to avoid interference therebetween. For achieving this, a control unit installed in a control box 51 (see FIG. 2) is employed, which emits suitable instruction radio signals to the carriers 25.

This may be carried out in the following manner.

First, as is seen from FIG. 1, the empty carrier 25 is moved to a predetermined position denoted by numeral 52. Then, the carrier 25 for the radiator core support 69 is moved to the transferring stage stage 24 in front of the empty carrier position 52, and then the carriers 25 for the left and right hood ridge structures 61 and 62 are moved to the respective transferring stages 24 located at left and right sides of the empty carrier position 52, and finally, the carrier 25 for the dash lower structure 63 is moved to the transferring stage 24 located behind the empty carrier position 52.

Figure 3:
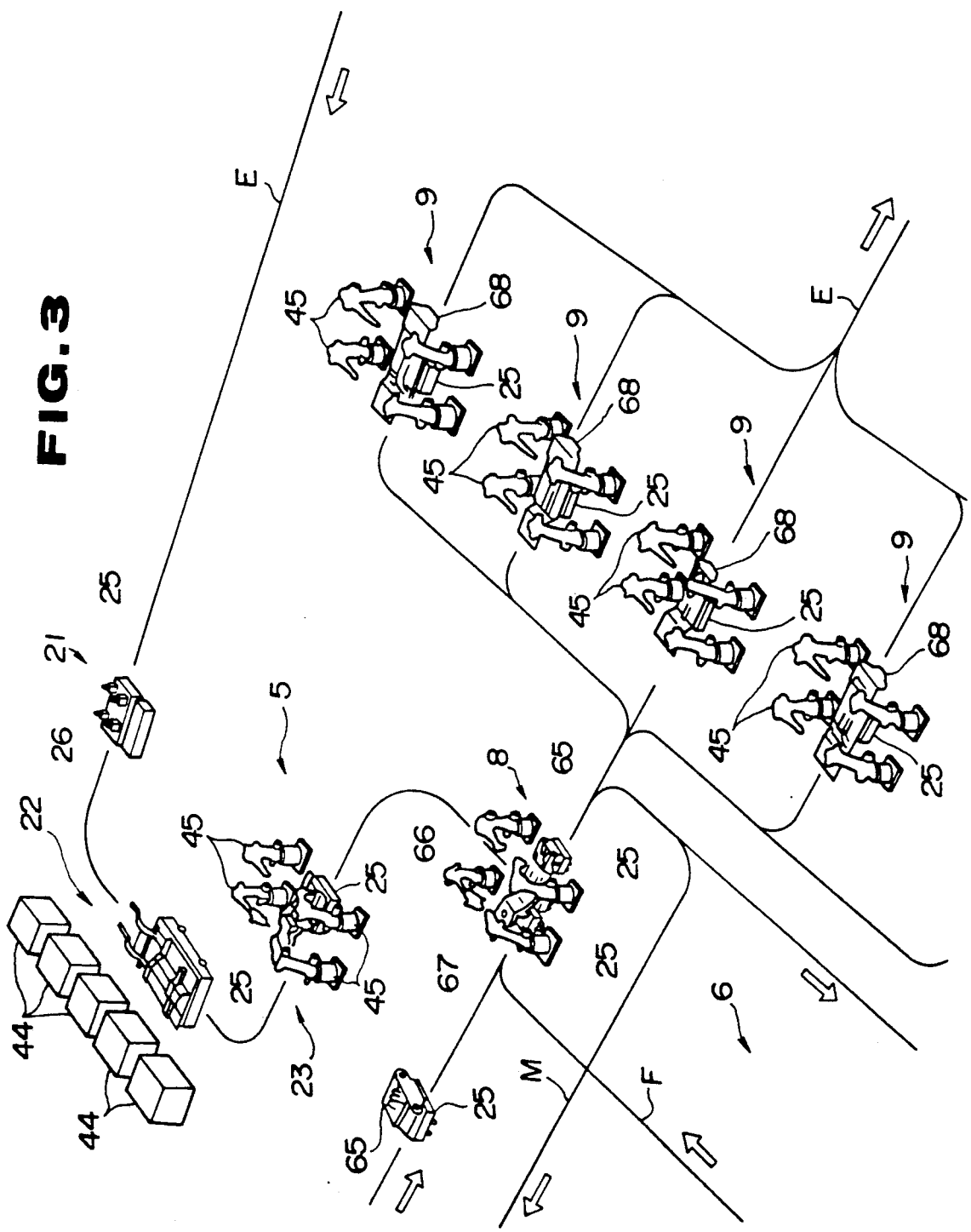
FIG. 3 is a perspective view showing schematically a floor main structure assembling stage, four floor main structure final welding stages and a subline for assembling a front floor structure.

As is seen from FIG. 3, at the floor main structure assembling stage 8, three work piece carriers 25 are collected and aligned, one being the carrier 25 on which the assembled engine compartment 65 is held, one being the carrier 25 on which the front floor structure 66 which has been assembled at the subline 5 is held and the other being the carrier 25 on which the rear floor structure 67 which has been assembled at the subline 6 is held. At the assembling stage 8, the engine compartment 65, the front floor structure 66 and the rear floor structure are positioned and spot-welded by spot-welding robots 45. With this, a floor main structure 68 is produced.

Thereafter, leaving the assembled floor main structure 68 at the assembling stage 8, two carriers 25 for the engine compartment 65 and the rear floor structure 67 return to the position 52 of the engine compartment assembling stage 7 and the type switching stage 21 of the rear floor structure assembling subline 6, respectively. Then, the remaining carrier 25 for the front floor structure 66 moves, with the assembled floor main structure 68 held thereon, to one of the floor main structure final welding stages 9.

In the illustrated embodiment, five stages 9 are employed. Receiving an instruction radio signal from one stage 9 which is empty, the carrier 25 enters the empty stage 9 and stops at a predetermined position. There, the floor main structure 68 is subjected to the final spot-welding. After this welding, the carrier 25 of the floor main structure 68 moves to the body main structure assembling stage 16, as will be seen from FIG. 1.

During the above-mentioned movement of the carriers 25, the carriers 25 for the roof panel structure, parcel shelf structure, air box structure and rear panel structure go around the corresponding sublines 10, 11, 12 and 13. In these sublines, the assembling stage 23 and the transferring stage 24 are combined.

As is seen from FIG. 1, there is arranged a looped overhead conveyer line 53 which goes along a given way "N" extending around and through the sublines 10, 11, 12 and 13 and the body main structure assembling stage 16.

The detail of the overhead conveyer line 53 is shown in FIG. 6. The conveyer line 53 comprises a looped guide truck "N" and a plurality of self-propelled work piece carriers 54 which run along the guide truck "N" in the direction of the arrows. Although not shown in the drawing, each carrier 54 is equipped with a known controller by which the movement of the carrier 54 is suitably controlled in accordance with the production speed of the vehicle bodies. As shown, each carrier 54 is equipped with a work piece positioning device 26 which includes three-dimensional moving mechanisms 29 and work piece holders 30. In order to control the moving mechanisms 29, actuating mechanisms 33 are also mounted to the carrier 54. It is to be noted that the parts 29, 30 and 33 are substantially the same as those shown in FIG. 4.

The operation of the overhead conveyer line 53 is as follows.

When, as is seen from FIG. 1, each carrier 54 comes to a type switching stage 21 for the line 53, the work piece holders 30 on the carrier 54 are newly positioned in accordance with the type of work pieces which will be held by the holders 30. Thereafter, the carrier 54 goes beside the sublines 10, 11, 12 and 13. During this, the roof panel structure 69, parcel shelf structure 70, air box structure 71 and rear panel structure 72, which have been assembled in their corresponding sublines 10, 11, 12 and 13, are transferred through the respective transferring stages 24 to the carrier 54, and they are carried to the body main structure assembling stage 16. During this movement, the work pieces 69, 70, 71 and 72 are positioned with respect to the carrier 54.

When the carrier 54 comes to the body main structure assembling stage 16, the carrier 54 is lowered by a drop lifter 55 placing the work pieces 69 to 72 on a predetermined position above the floor main structure 68.

As is seen from FIGS. 1 and 6, at the body main structure assembling stage 16, there are further collected the carriers 25 for the left and right body side structures 73 and 74. These structures 73 and 74 have been assembled at the corresponding sublines 14 and 15. Each subline 14 or 15 includes a type switching stage 21, two work piece pick up stages 22 and two assembling stages 23 for manipulating inner and outer body panels.

As is understood from FIG. 6, at the body main structure assembling stage 16, the left and right body side structures 73 and 74 are placed at both sides of the floor main structure 68 and positioned with respect to the structure 68.

When the floor main structure 68, left and right body side structures 73 and 74, roof panel structure 69, parcel shelf structure 70, air box structure 71 and rear panel structure 72 are positioned in the above-mentioned manner, they are spot-welded by a spot-welding robot 45. With this, a body main structure is produced.

Thereafter, leaving the body main structure thus assembled, the overhead carrier 54 is lifted up by the drop lifter 55 and returns through the guide way "N" to the type switching stage 21 upstream of the roof panel structure assembling subline 10. The carriers 25 for the left and right body side structures 73 and 74 return to the respective type switching stages 21 of the sublines 14 and 15, and then the carrier 25 for the front floor structure 66 moves, with the assembled body main structure held thereon, to one of the body main structure final welding stages 17.

In the illustrated embodiment, five stages 17 are employed. That is, the carrier 25 on which the body main structure is held enters an empty stage 17 and stops at a predetermined position. There, the body main structure is subjected to the final spot-welding. After this final spot welding, the carrier 25 moves to a transferring stage (not shown) and there the carrier 25 transfers the solidly assembled body main structure to a drop lifter (not shown). Thereafter, as is seen from FIGS. 1 and 3, the carrier 25 free of the body main structure returns to the type switching stage 21 of the front floor structure assembling subline 5 through the guide way "E".

In the following, advantageous features of the abovementioned vehicle body assembling line will be described.

In each subline, the operation of the plurality of moving mechanisms 29 of the work piece carrier 25 is carried out by the common servomotor 35 which is mounted on the type switching stage 21. This means that the number of servomotors used in the assembling line is greatly reduced as compared with the aforementioned conventional assembling line. Furthermore, the reduction in number of the servomotors induces a simple and low cost construction of a control unit by which the servomotors are controlled.

The work piece carriers 25 employed are of a self-propelled and radio-controlled type. Thus, various types of sublines are readily constructed by only changing the number of the carriers 25 used therein. This induces a very large freedom in designing of the vehicle body assembling line.

During movement of each carrier, the work piece or work pieces on the carrier are tightly held in position by the work piece positioning device 26. This facilitates setting and positioning of the work piece on an assembling stage 7, 8 or 16.

Figure 7:
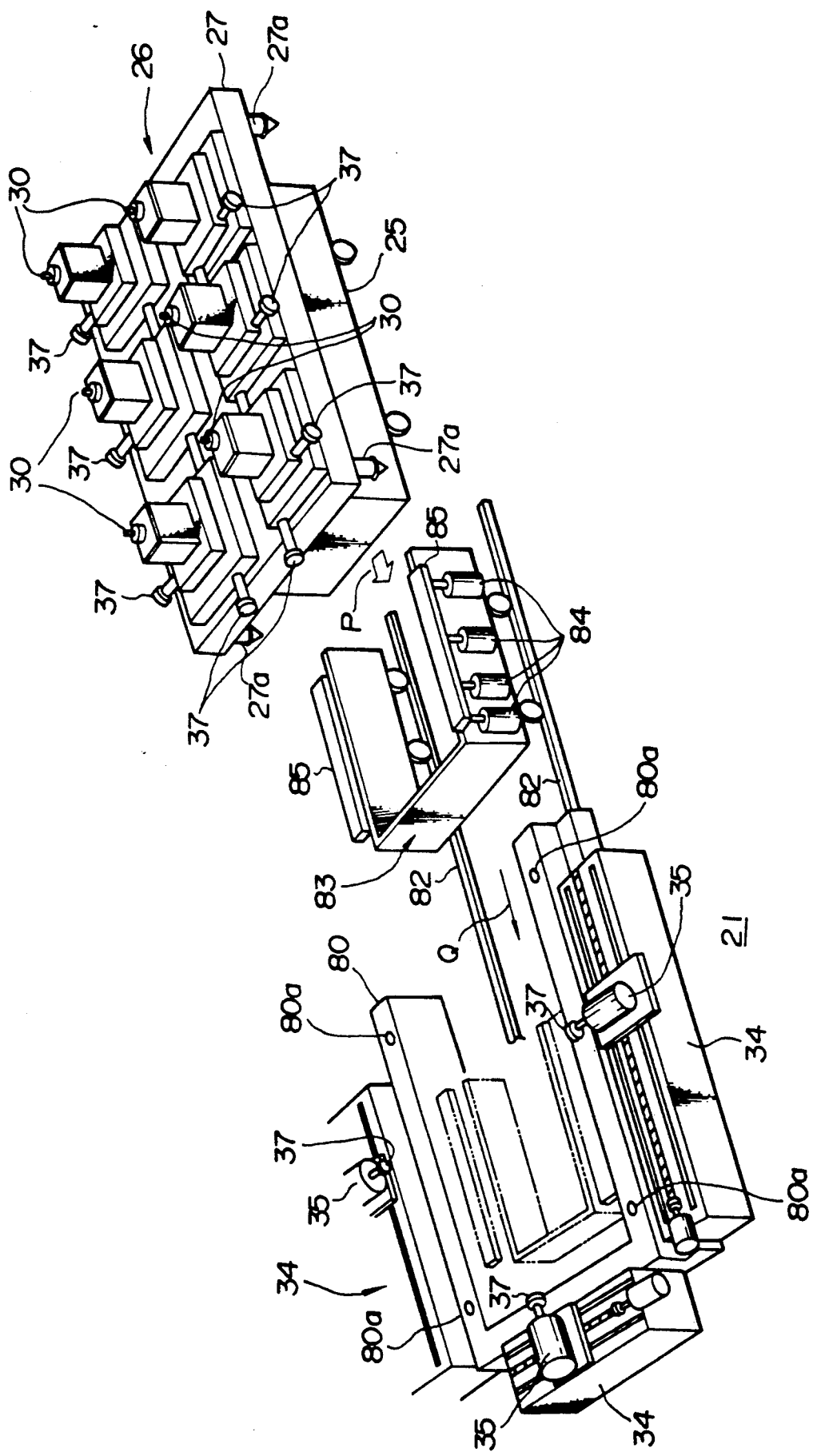
FIG. 7 is a perspective view showing another method for changing the positions of the work piece holders of the work piece positioning device.
Figure 8:
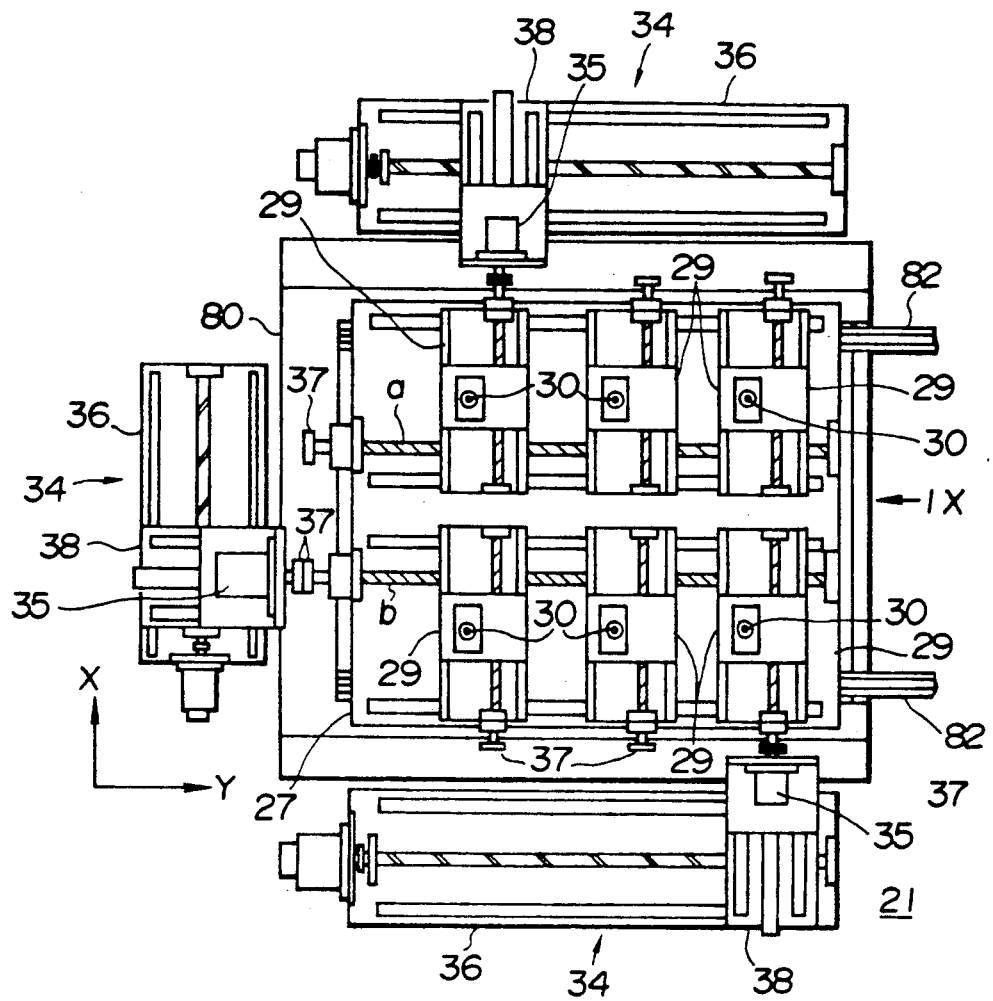
FIG. 8 is a plan view of the work piece positioning device of FIG. 7, which is located at the type switching stage.
Figure 9:
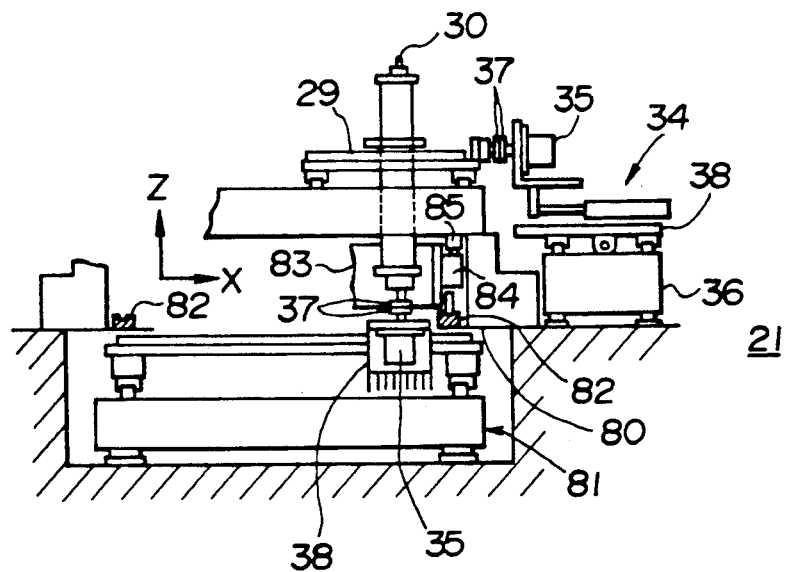
FIG. 9 is a view taken from the direction of the arrow "IX" of FIG. 8.

Referring to FIGS. 7, 8 and 9, there is shown another method for selectively changing the position of the work piece holders 30 of the work piece positioning device 26. It is to be noted that the work piece holders 30 shown in these drawings are of a type which has a locating pin which is adapted to be inserted into a locating bore of a work piece or work pieces.

In this measure, the base board 27 of the device 26 is detachably mounted on the work piece carrier 25, as is understood from FIG. 7.

As is seen from FIG. 8, each ball screw has an outer end to which one part of the coupling 37 is fixed. Two parallel ball screws "a" and "b" extend in the direction of the arrow "Y" over the base board 27. Each ball screw "a" or "b" is arranged to selectively operate three moving mechanisms 29. The mechanism for achieving this selective operation is disclosed in Japanese Patent Application No. 63-15818 which was filed by the same applicants.

As is seen from FIG. 7, the type switching stage 21 has a generally U-shaped seat structure 80 onto which the base board 27 of the work piece positioning device 26 is seated when the position change of the work piece holders 30 is needed. The seat structure 80 has four locating bores 80a into which locating pins 27a of the base board 27 are inserted upon seating of the base board 27 onto the seat structure 80. Three drive devices 34, which are substantially the same as the above-mentioned drive device 34 shown in FIG. 4, are arranged to surround the U-shaped seat structure 80.

As is seen from FIG. 9, a so-called "Z-direction mover" 81 is arranged within the U-shaped seat structure 80. The mover 81 is arranged to move a servomotor shifter 38 horizontally, that is, in a direction parallel to the X-Y plane. The servomotor shifter 38 is substantially the same as servomotor shifters 38 employed in the three drive devices 34.

As is best seen from FIG. 7, two guide rails 82 extend on the factory floor from a bridge part of the U-shaped seat structure 80 to a certain position beyond the open side of the structure 80. The rails 82 carry thereon a generally U-shaped transferring carrier 83 which is sized to receive therein the work piece carrier 25. The transferring carrier 83 is driven on the rails 82 by a driving chain line or the like between a so-called "base board catching position" as illustrated by a solid line and a so-called "work piece holder position changing position" as illustrated by a phantom line.

The transferring carrier 83 is equipped at both sides thereof with lifters each including a plurality of air cylinders 84 and an elongate plate 85 driven by the air cylinders 84. Thus, upon energization of the air cylinders 84, the elongate plates 85 are moved upward. That is, when, as is seen in FIG. 7, the carrier 25 moves in the direction of the arrow "P" and enters the transferring carrier 83, the lifters operate to lift up the work piece positioning device 26 from the carrier 25. Then, the transferring carrier 83 moves in the direction of the arrow "Q" together with the base board 27 of the work piece positioning device 26 and enters the U-shaped seat structure 80 and stops at a predetermined position wherein the locating pins 27a of the base board 27 are aligned with the corresponding locating bores 80a of the seat structure 80. Then, the lifters operate to lower the work piece positioning device 26 onto the seat structure 80 having the locating pins 27a gradually inserted into the corresponding locating bores 80a. When the position change of the work piece holders 30 is achieved in an after-mentioned manner, the work piece positioning device 26 is returned to the carrier 25 by carrying out the steps in reverse.

The position change of the work piece holders 30 is carried out by controlling the drive devices 34 and the Z-direction mover 81 in substantially the same manner as has been mentioned in the part of FIG. 4.

It is to be noted that in the above-mentioned system of FIGS. 7, 8 and 9, a much simpler arrangement is achieved by the work piece positioning device 26 because there is no means which corresponds to the actuating mechanism 33 employed in the system of FIG. 4.

Figure 10:
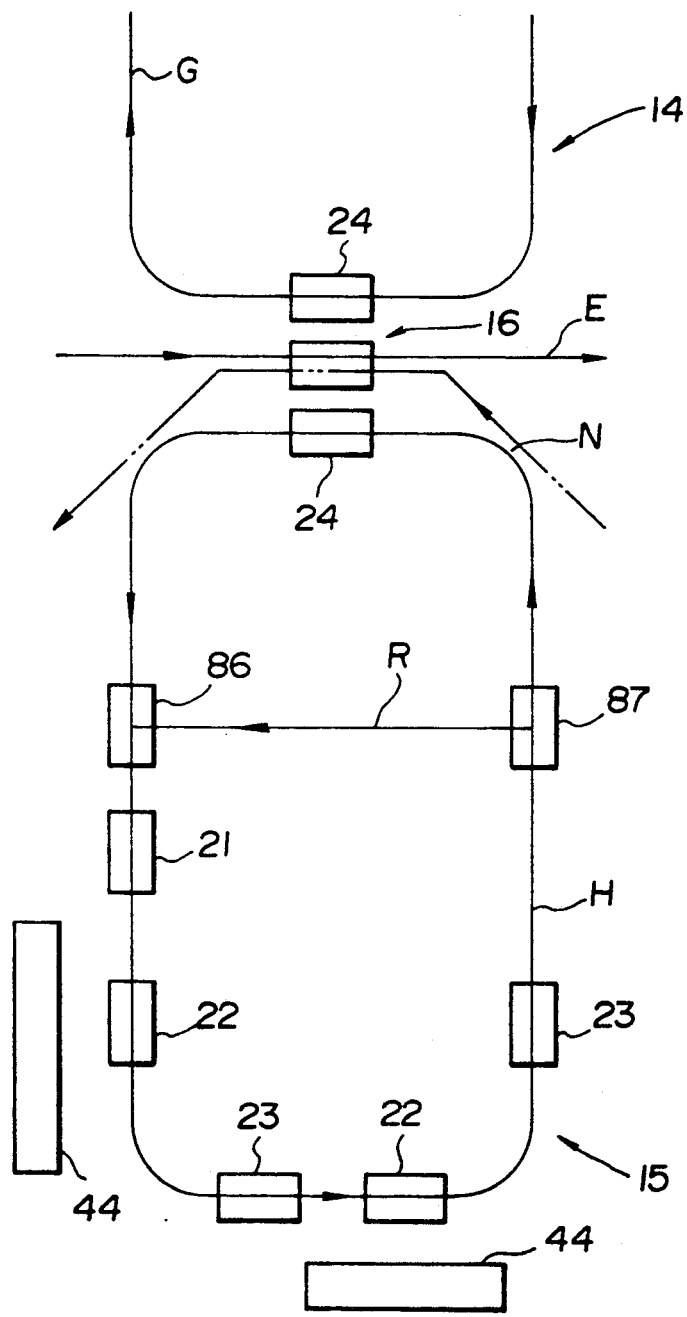
FIG. 10 is a schematically illustrated layout of a modified subline for assembling a right body side structure.

Referring to FIG. 10, there is shown a third embodiment of the present invention. In this embodiment, equal modification is applied to both the right and left body side structure assembling sublines 15 and 14.

For ease in understanding, the description of the third embodiment will be made with respect to only the right body side structure assembling subline 15. That is, as is seen from FIG. 10, a joining stage 86 and a separating stage 87 are further employed in the assembling line 15. The joining stage 86 is located between the transferring stage 24 located beside the body main structure assembling stage 16 and the type switching stage 21, and the separating stage 87 is located between the second assembling stage 23 and the transferring stage 24. The joining stage 86 and the separating stage 87 are connected through a bypass conveyer line "R" constructed of for example, a slat conveyer or the like.

Figure 11:
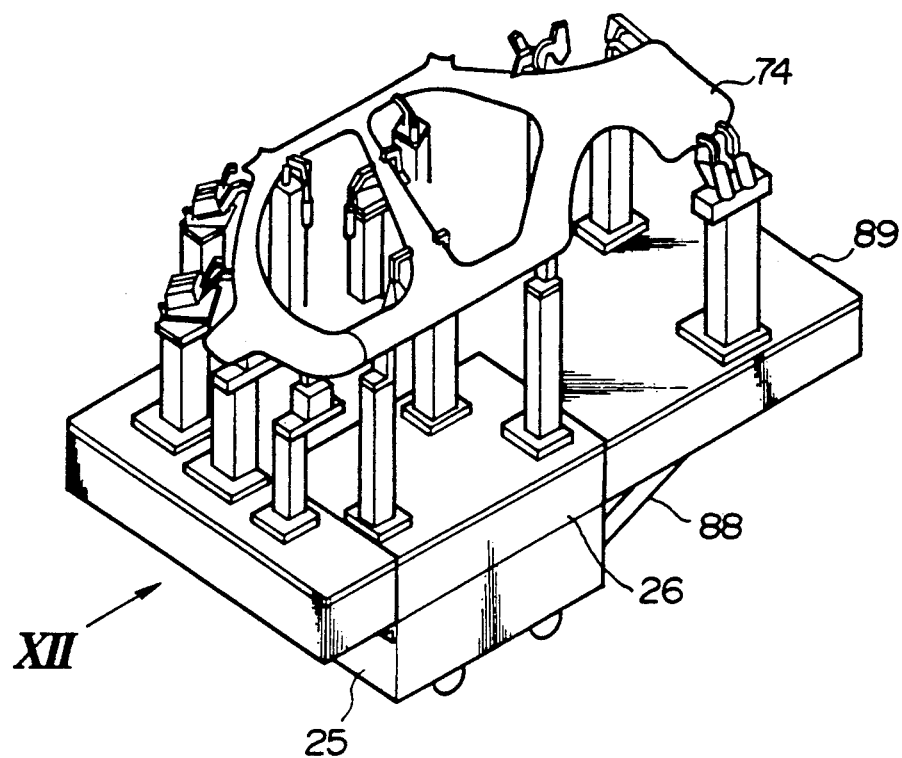
FIG. 11 is a perspective view of a work piece carrier which is employed in the right body side structure assembling subline of FIG. 10, the carrier mounting thereon two work piece positioning devices in a coupled condition.
Figure 12:
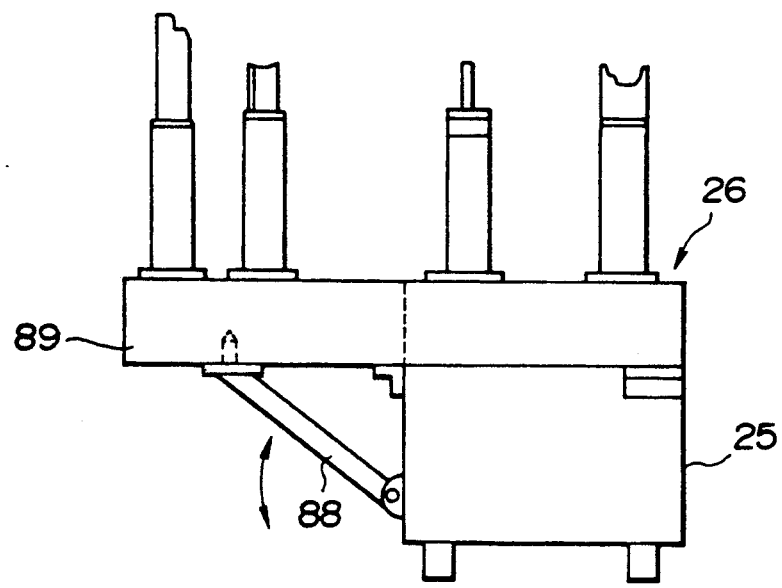
FIG. 12 is a view taken from the direction of the arrow "XII" of FIG. 11.

As is seen from FIGS. 10 and 11, at the joining stage 86, the work piece positioning device 26 on the carrier 25 from the transferring stage 24 is joined together with another work piece positioning device 89 which is conveyed thereto through the conveyer line "R". For this joining, the carrier 25 has several support arms 88 pivotally connected thereto. That is, as is seen from FIG. 12, when in use, the support arms support thereon the base board of the device 89. Although not shown in the drawings, a transferring robot is located at a downstream part of the conveyer line "R" for transferring the positioning device 89 from the conveyer line "R" onto the carrier 25.

The carrier 25 on which the two joined positioning devices 26 and 89 are held then moves along a guide way "H" in the direction of the arrows through the type switching stage 21, the work piece pick up stage 22, the assembling stage 23, the second work piece pick up stage 22 and the second assembling stage 23 and comes to the separating stage 87.

Figure 13:
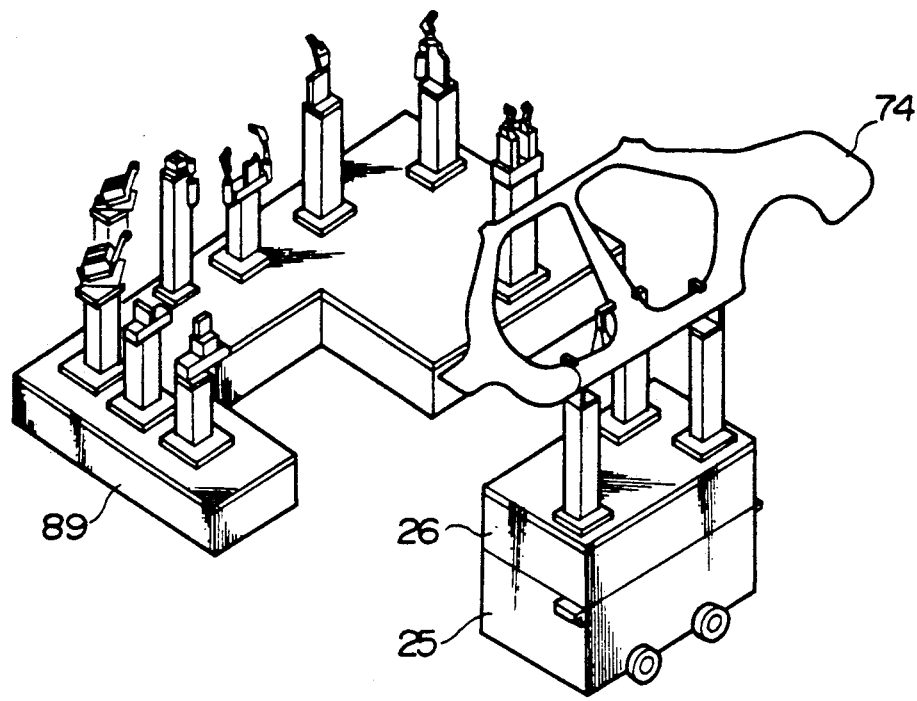
FIG. 13 is a perspective view of the carrier of FIG. 11, but showing the two work piece positioning devices in a separated condition.

As is seen from FIG. 13, at the separating stage 7, the positioning device 89 is separated from the positioning device 26 on the carrier 25 and transferred to an upstream part of the conveyer line "R". For achieving the transferring of the positioning device 89 onto conveyer line "R", a transferring robot is located at the upstream part of the line "R".

The carrier 25 on which only the positioning device 26 is held moves toward the transferring stage 24 beside the body main structure assembling stage 16.

In the third embodiment, the two positioning devices 26 and 28 can be used in a combined fashion for the time during which a very complicated positioning is needed for assembling the right body side structure 74 from a plurality of work pieces.

Furthermore, during the time for which the assembled right body side structure 74 is carried to the transferring stage 24 beside the body main structure assembling stage 16, only the positioning device 26 is used for holding the structure 74. This induces a space saving at the area where the body main structure assembling stage 16 is placed. Of course, this space saving facilitates the work for assembling the body main structure.

Figure 14:
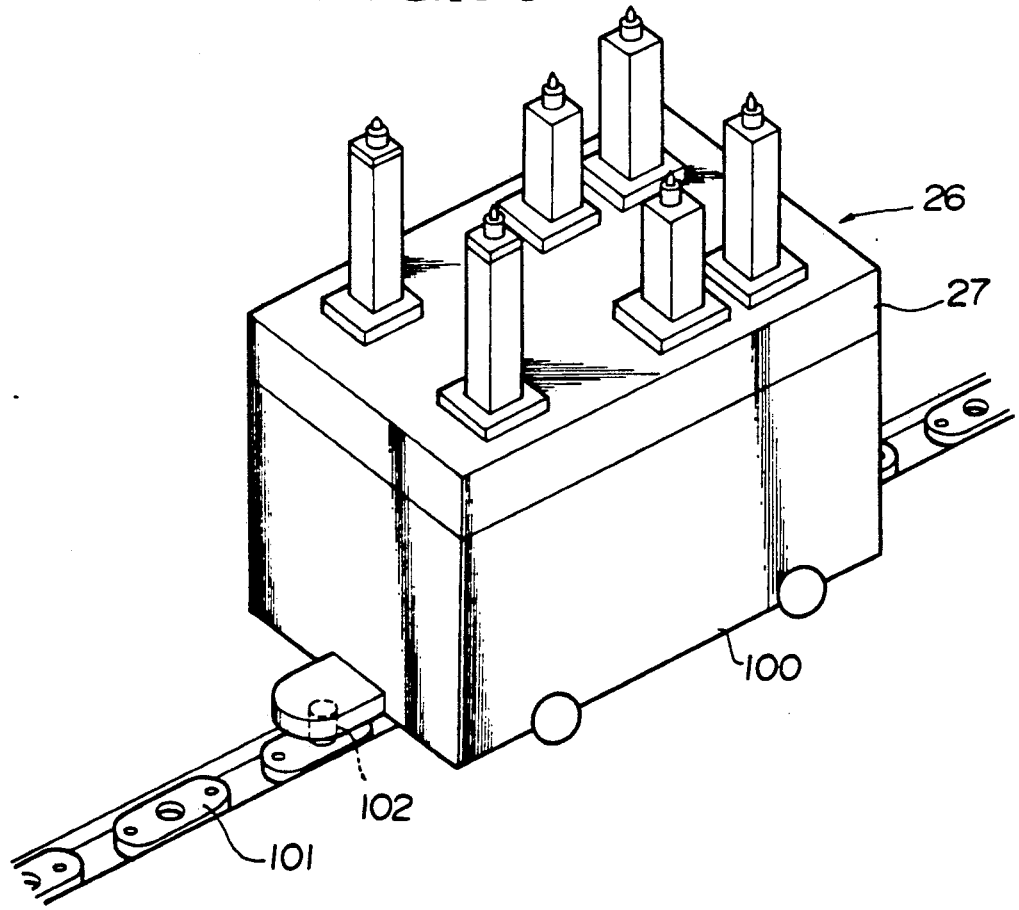
FIG. 14 is a perspective view of another work piece carrier which is usable in the present invention.

Referring to FIG. 14, there is shown another work piece carrier 100 which is usable in the vehicle body assembling line. That is, similar to the above-mentioned carrier 25, this carrier 100 carries thereon the work piece positioning device 26. However, the carrier 100 is not of the self-propelled type, and thus the carrier 100 is driven by a chain line 101 which runs along a given way on the factory floor. That is, the carrier 100 has a hook pin 102 which is selectively engageable with the chain line 101. When the carrier 100 comes to a predetermined position near an assembling stage, a lifter (not shown) slightly lifts up the carrier 100 to disengage the same from the chain line 101.

Figure 15:
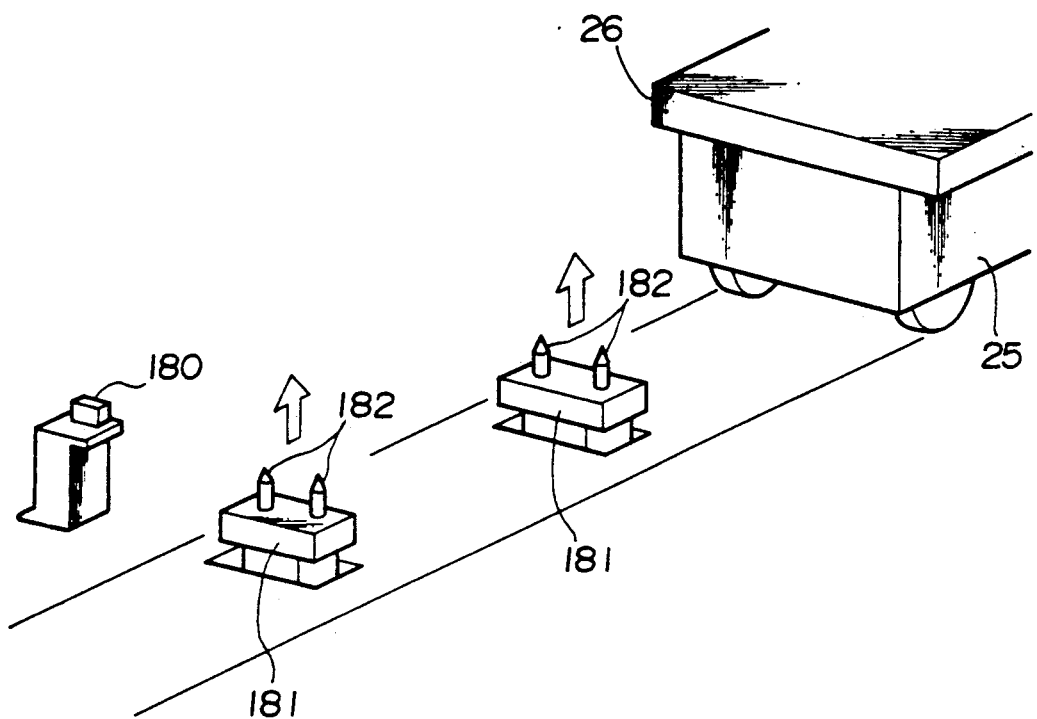
FIG. 15 is a perspective view of a carrier positioning device which is employed in the vehicle body assembling line of FIG. 1.
Figure 16:
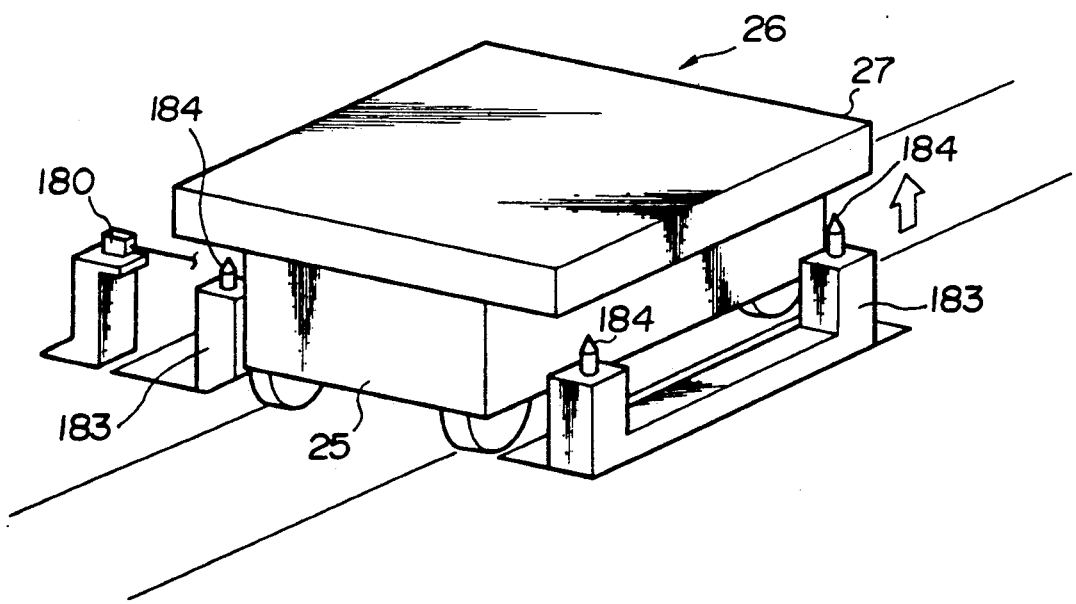
FIG. 16 is a perspective view of another carrier positioning device which is employable in the vehicle body assembling line of FIG. 1.

Referring to FIGS. 15 and 16 of the drawings, there are respectively shown two systems for stopping and positioning the carrier 25 at the predetermined position near each stage 21, 22, 23, 24, 7, 8, 9, 16 and 17.

In the system shown in FIG. 15, when a position sensor 180 senses that the carrier 25 comes to a predetermined position, two lifters 181 mounted in the factory floor are lifted up for lifting up the carrier 25. Each lifter 181 has locating pins 182 which are inserted into locating bores of the carrier when the lifting of the lifters 181 is carried out.

In the system shown in FIG. 16, when the position sensor 180 senses the arrival of the carrier 25, two side lifters 183 mounted in the factory floor are lifted up for lifting up only the work piece positioning device 26.

Figure 17:
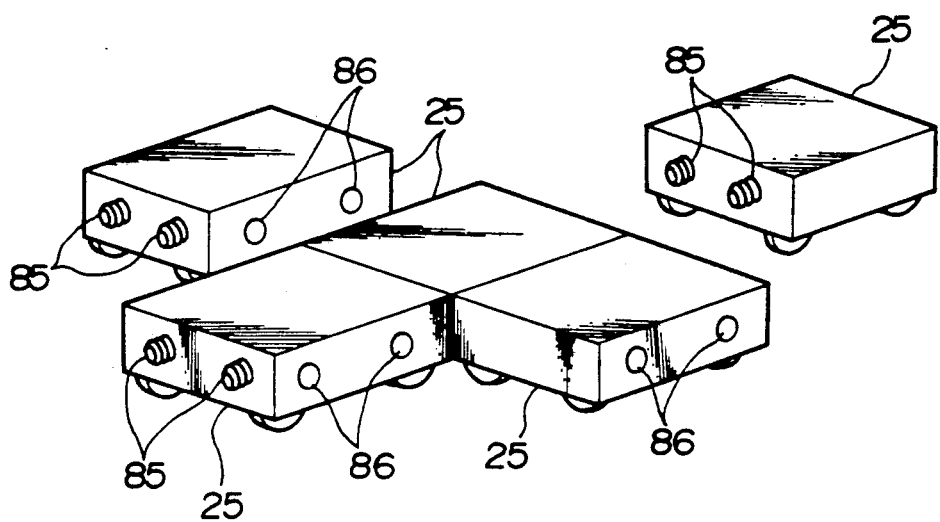
FIG. 17 is a perspective view showing the manner in which a plurality of work piece carriers are positioned at a certain stage.
Figure 18:
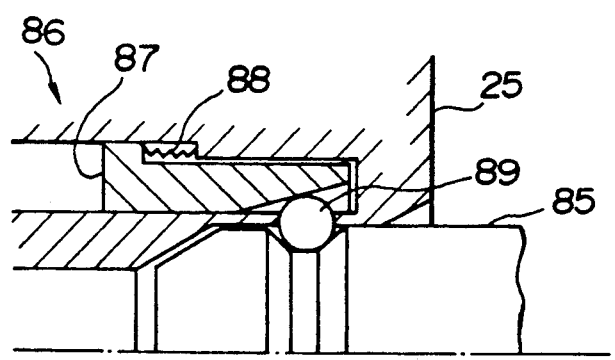
FIG. 18 is a sectional view showing the method in which two carriers are coupled.

Each lifter 183 has locating pins 184 which are inserted into locating bores of the base board 27 of the positioning device 26 when the lifting of the lifters 183 is carried out. Referring to FIGS. 17 and 18, there is shown a method for stopping and positioning a plurality of carriers 25 at the corresponding predetermined positions at a stage, such as, the engine compartment assembling stage 7 and the floor main structure assembling stage 8. That is, each carrier 25 is provided with male and female members 85 and 86. When adjacent carriers 25 approach and contact to one another in the predetermined positions, the male members 85 of one carrier 25 are brought into latching engagement with the female members 86 of the other carrier 25.

As is seen from FIG. 18, the female member 86 comprises a tubular piston 87 axially movably received a tubular space formed in the carrier 25. A plurality of balls 89 are received in respective openings formed in an inner cylindrical wall of the tubular space. Each ball is thus partially exposed to a major cylindrical bore around which the tubular space is defined. The tubular piston 87 has a tapered inner surface engaged with the balls. A spring 88 is disposed in the tubular space to bias the tubular piston 87 in a direction to move the piston 87 away from the balls 89. Under practical use, pressurized air is kept applied to the piston 87 against the spring 88. The male member 85 comprises a pin which has at a front portion an annular groove. Then, when, due to contact between the adjacent two carriers 25, the male member 85 is inserted into the female member 86, the balls 89 are brought into engagement with the annular groove in a snap action manner thereby achieving a coupling between the two carriers 25.

Thus, when one of the carriers 25 is positioned, the other carriers 25 are automatically positioned when they are coupled with the carrier 25.

Figure 20A:
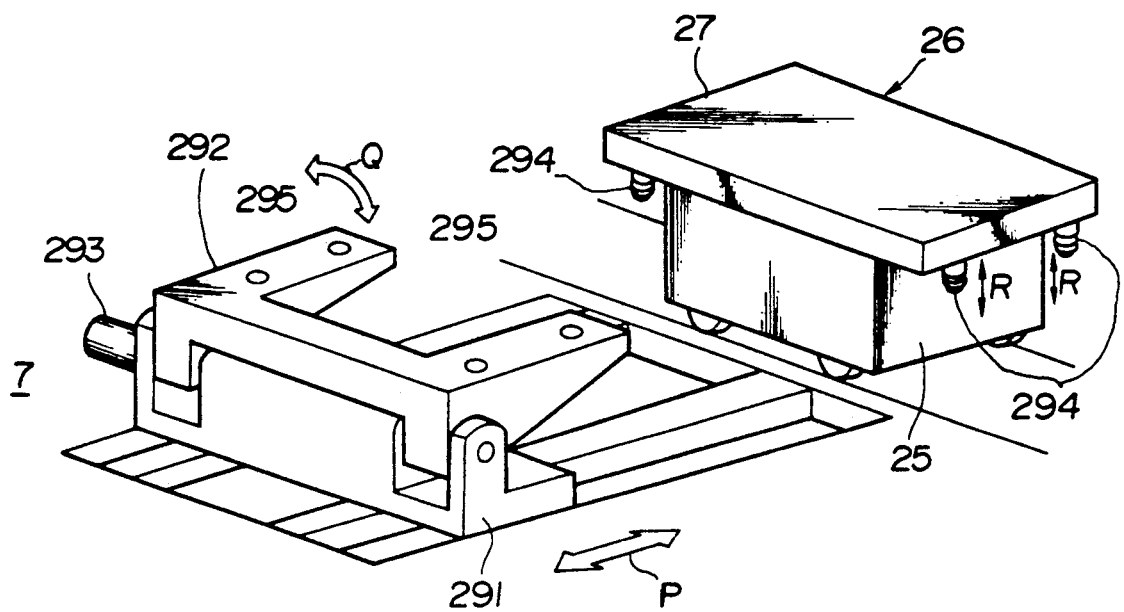
FIG. 20A is a perspective view of a positioning device for the work piece positioning device, which is located at an assembling stage of the vehicle body assembling line of FIG. 1.
Figure 20B:
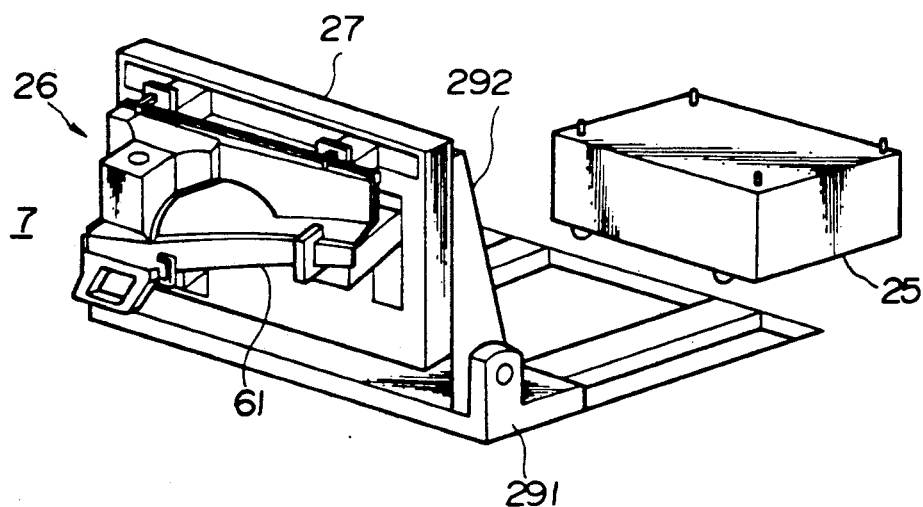
FIG. 20B is a view similar to FIG. 20A, but showing the positioning device in a different operating condition.

Referring to FIGS. 20A and 20B, there is shown another system for positioning the work piece positioning device 26 at the engine compartment assembling stage 7. In this system, there is employed a moving stand 291 which moves reciprocating in the directions of the arrow "P". The moving stand 291 has a supporting fork 292 pivotally connected thereto. An electric motor 293 is connected to the stand 291 to pivotally move the supporting fork 292 between a horizontal position as shown in FIG. 20A and a vertical position as shown in FIG. 20B.

As shown in FIG. 20A, the base board 27 of the work piece positioning device 26 has at a lower side four telescopically movable clamping pins 294, each being expandable in the direction of the arrow "R". The supporting fork 292 has four bores 295 in which respective chucks are installed.

When, in operation, the carrier 25 comes to a predetermined position together with the work piece positioning device 26 mounted thereon, the moving stand 291 with the supporting fork 292 kept horizontal moves toward the carrier 25 and stops at a position where the clamping pins 294 of the base board 27 are aligned with the bores 295 of the supporting forks 292. Then, the clamping pins 294 expand and enter the corresponding bores 295. With this, the clamping pins 294 are caught by the chucks in the bores 295. Then, with energization of the motor 293, the supporting fork 292 is pivoted to the vertical position lifting up the positioning device 26 from the carrier 25, and then the moving stand 291 moves away from the carrier 25 and comes to a predetermined position as shown in FIG. 20B. With this, the work piece 61 (which is, for example, the left hood ridge structure) becomes positioned at the engine compartment assembling stage 7.

Figure 21A:
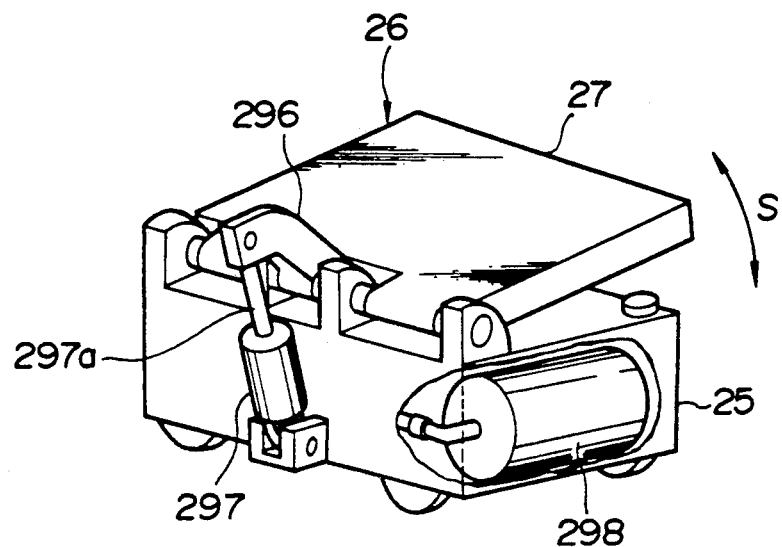
FIG. 21A is a perspective view of a work piece carrier which is equipped with another positioning device for the work piece positioning device, the carrier being employable in the present invention.
Figure 21B:
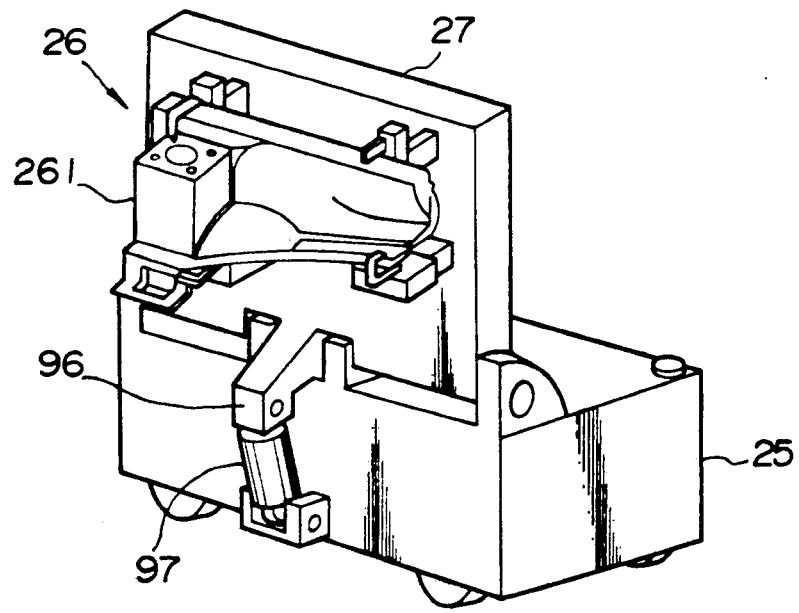
FIG. 21B is a view similar to FIG. 21A, but showing the positioning device in a different operating position.

Referring to FIGS. 21A and 21B, there is shown still another system for positioning the work piece positioning device 26 at the engine compartment assembling stage 7. In this system, the work piece carrier 25 has the work piece positioning device 26 pivotally connected thereto. That is, the base board 27 of the positioning device 26 has one side pivotally connected to one upper side of the carrier 25, as is shown in FIG. 21A. The base board 27 has an upwardly extending arm 296 to which one end of a piston rod 297a of an air cylinder device 297 is pivotally connected. The air cylinder device 297 is pivotally connected to the carrier 25. A tank 298 for pressurized air is installed in the carrier 25.

When, in operation, the carrier 25 comes to a predetermined position at the engine compartment assembling stage 7, the pressurized air is fed to the cylinder device 297 through a control valve (not shown). With this, the work piece positioning device 26 is pivoted to a vertical position as shown in FIG. 21B. Under this condition, the work piece 261 on the positioning device 26 is positioned at the engine compartment assembling stage 7.

What is claimed is:

1. A flexible manufacturing system for assembling various types of vehicle bodies, which comprises:
   a main assembling line;
   a plurality of sublines located beside the main assembling line, each subline including a plurality of work piece carriers which run along a guide way and a work piece positioning device mounted on each of the work piece carriers, each work piece positioning device including a plurality of position changeable work piece holders by which at least one work piece is held and positioned with respect to the carrier; and
   a plurality of assembling stages which are arranged on spaced portions of the main assembling line, each assembling stage having respective positions to which given ones of said sublines are connected,
   wherein each subline further includes a type switching stage which has a power source mounted therein, said type switching stage actuating the positioning device to change the positions of the position changeable work piece holders when the corresponding carrier comes to the type switching stage.

2. A flexible manufacturing system as claimed in claim 1, in which said position changeable work piece holders are grouped into a plurality of groups, each group having its own power input means to which said power source of said type switching stage is connectable for achieving the position change of the work piece holders.

3. A flexible manufacturing system as claimed in claim 2, in which said power source comprises an electric motor whose output shaft is brought into connection with the power input means of each group of the work piece holders when said carrier comes to said type switching stage.

4. A flexible manufacturing system as claimed in claim 3, in which said carrier is of a self-propelled and radio controlled type.

5. A flexible manufacturing system as claimed in claim 4, in which said carrier is constructed to carry thereon two work piece positioning devices.

6. A flexible manufacturing system as claimed in claim 1, in which each carrier is equipped with coupling means, so that when two carriers are collected at the same position, they can be coupled.

7. A flexible manufacturing system as claimed in claim 1, in which at least one of said sublines includes a pivotal positioning device for achieving positioning of the work piece positioning device with respect to a certain assembling stage.

8. A flexible manufacturing system as claimed in claim 6, in which said pivotal positioning device comprises:
   a moving stand which is movable toward and away from said carrier;
   a supporting fork which is pivotally connected to said moving stand, said supporting fork being pivotal from a horizontal position and a vertical position, said supporting fork being capable of lifting up said work piece positioning device from the carrier; and
   an electric motor for pivoting said supporting fork upon electric energization.

9. A flexible manufacturing system as claimed in claim 6, in which said pivotal positioning device comprises:
   a base board of said work piece positioning device, said base board being pivotally connected to said carrier, said base board having an upwardly extending arm;
   an air cylinder device held by said carrier, said air cylinder device having a piston rod pivotally connected to said arm; and
   a pressurized air source installed in said carrier, said air source being connected to said air cylinder device.

10. A flexible manufacturing system as claimed in claim 9, wherein said air source is connected to said air cylinder device when said carrier is in a predetermined position at a respective one of said assembling stages.

* * * * *